(No Model.)
W. J. KAUFFMAN.
WHEEL RIM BOLTING MACHINE.
No. 418,520. Patented Dec. 31, 1889.
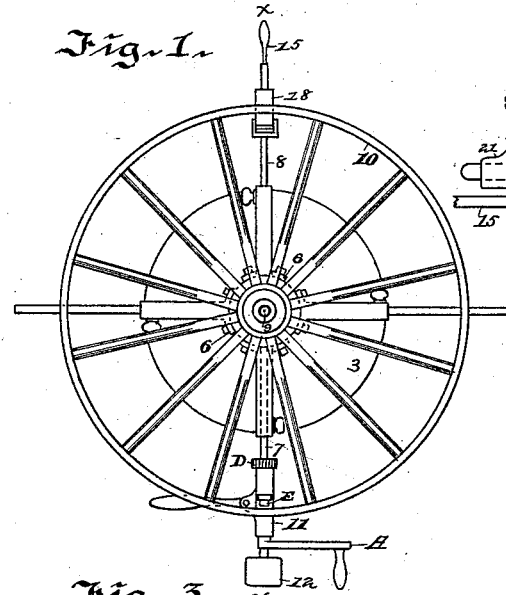
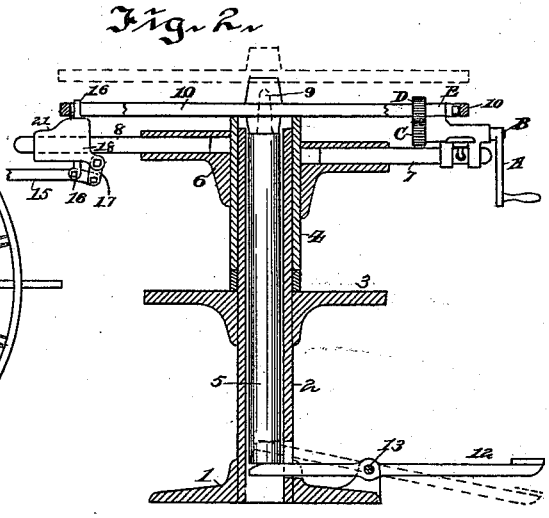
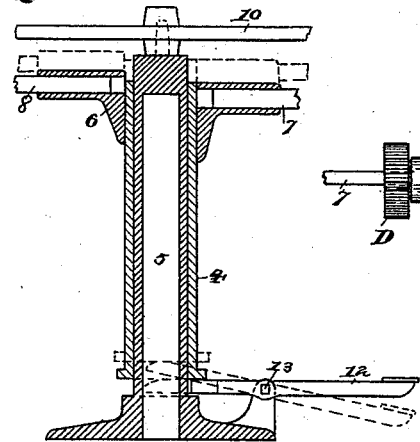
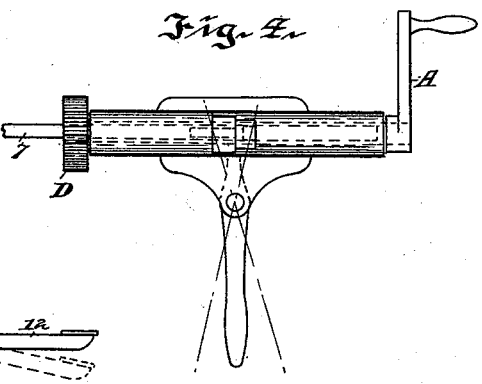
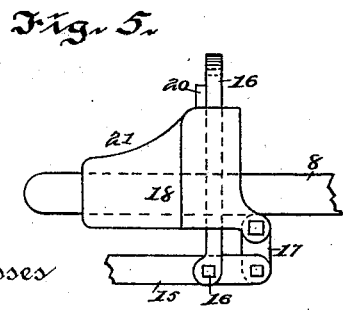
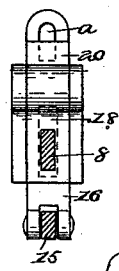
Witnesses
Inventor
William J. Kauffman
By his Attorney m
UNITED STATES PATENT OFFICE.

WILLIAM J. KAUFFMAN, OF MIAMISBURG, OHIO, ASSIGNOR OF ONE-HALF TO JAMES A. KAUFFMAN, OF SAME PLACE.

WHEEL-RIM-BOLTING MACHINE.

SPECIFICATION forming part of Letters Patent No. 418,520, dated December 31, 1889.

Application filed October 5, 1889. Serial No. 326,094. (No model.)

*To all whom it may concern:*

Be it known that I, WILLIAM J. KAUFFMAN, a citizen of the United States, and a resident of Miamisburg, in the county of Montgomery and State of Ohio, have invented certain new and useful Improvements in Wheel-Rim-Bolting Machines, of which the following is a specification.

My invention relates to a novel structure for bolting the rims and trimming off the bolts of carriage-wheels.

The object of my invention is to provide a device on which the wheel may be mounted and revolved, the bolts put through, the nuts turned upon them, and then the nuts trimmed in a rapid and more efficient manner than has been accomplished by any means hitherto employed, all of which will be fully set forth in the description of the accompanying drawings, making a part of this specification, in which—

Figure 1 is a top plan view of my invention with the wheel in position for use. Fig. 2 is a central cross-section on line x x of the same. Fig. 3 is a modified form of device for bringing the table to the wheel. Fig. 4 is a top plan view of the nut-turning device. Fig. 5 is a side elevation, and Fig. 6 is an end elevation, of the bolt-trimming device.

1 represents the base of the machine; 2, an upright to which the table 3 is attached.

4 represents the revolving sleeve journaled upon the cylindrical upright 2. 6 represents brackets rigidly attached thereto, containing sockets in which arms 7 and 8 are placed, on which the working-tools are mounted.

9 represents a stud on which the wheel 10 is journaled. The hub rests on the spindle 5.

11 represents a gear-wrench adjustably mounted on the arm 7. This arm is likewise adjustably journaled in the socket of the bracket 6, so that said arm may be drawn in or out to accommodate itself to different-sized wheels. The said gear-wrench is likewise longitudinally adjustable upon arm 7.

A represents a crank attached to the spindle B, driving gear-wheel C, which in turn drives gear-wheel D, to which is keyed the spindle E. The outer end of said spindle E has a socket adapting it to fit the nut, so that as crank A is turned the wheels C D are driven and turn the nut engaged by said socket, the nut-driving device moving readily upon the arm 7 as the nut is turned.

In Fig. 2 I have shown the wheel as adjustable vertically upon the spindle 5 by means of the foot-lever 12, journaled on center 13, the forward end of which engages with said spindle, so that the wheel may be raised up in position shown in dotted lines and then revolved or turned so as to bring another part of the wheel into the right position when it is lowered so as to come in juxtaposition to the tool; but it will be observed that this operation may be reversed, as I have shown it in Fig. 3, in which case the spindle or upright 5 is stationary, and the sleeve 4, carrying the tool-holding arm 7 8, is made to be raised or lowered by the foot-lever, so as to bring the tool into line with the wheel. These two modes are equivalent. On the arm 8, I have mounted a bolt-trimmer, which is adapted to slide freely along said arm.

15 represents a lever hinged to the bolt-cutter 16 and the link 17, which is in turn hinged to the head 18 of the bolt-cutter. The tool 16 rises and falls in the cutter-head 18 as the lever 15 is operated. In the top of this tool-cutter is pierced a slot-orifice a, the edges of which are made sharp. It is raised sufficiently to allow the stem of the bolt to pass through when the knife is depressed by the lever 15 and the bolt sheared or clipped off against the rest 20. This bolt-cutter head 18 is adjustable longitudinally on the arm 8, which is likewise adjustable in the socket of hub 6, in which it is journaled, so that the tool may be adjusted to the arm (out and in) to suit different-sized wheels.

The head of the bolt-cutter is provided with a flat side 21, so that the rim of the wheel can be brought onto this seat 21 for hammering down the iron by sliding the cutter-head 18 forward under the rim, engaging the rim of the wheel through which the bolt passes, thus serving as an anvil. This anvil or seat might be upon an independent arm; but it is more convenient to annex the anvil upon the head 18. It will also be observed that the arms 7 and 8 on their sleeve can be revolved independently of the wheel by reason of said sleeve 4 being loosely journaled upon the cylindrical upright 2. I have shown no locking mechanism to hold the arms 7 and 8 in a fixed position or the wheel in a fixed position. As the work is to be done rapidly and is comparatively light, the operator can easily hold the parts in position without the necessity of locking or unlocking said parts against rotary motion. Such locking mechanism can, however, be readily supplied, if desired.

By journaling the sleeve 4 around the cylindrical upright 2 it can be revolved to bring the arms 7 and 8 and the tools supported on said arms in proper relation to the bolts and nuts of the wheel-rim, and by making said arms and tools longitudinally adjustable they can be readily adapted to different sizes of wheels. As before observed, the machine can be arranged either to permit a vertical adjustment of the wheel by means of the spindle 5 or a vertical adjustment of the tool-carrying arms 7 and 8 by means of the sleeve 4, so as to permit of a change in the relative position of the wheel and tools, as required in operating successively upon the several nuts and bolts.

Having described my invention, what I claim is—

1. In a wheel-rim-bolting machine, the combination of a cylindrical upright, above which the wheel is mounted, a sleeve journaled on said upright and carrying a horizontal arm, and a gear-nut wrench longitudinally adjustable on said arm, substantially as described.

2. In a wheel-rim-bolting machine, the combination of a cylindrical upright, above which the wheel is mounted, a sleeve journaled on said upright, an arm carried by said sleeve, and a longitudinally-adjustable bolt-cutter mounted on said arm, substantially as described.

3. In a wheel-rim-bolting machine, the combination of the cylindrical upright 2, the spindle 5, the revolving sleeve 4, provided with arms 7 and 8, and a nut-wrench and a bolt-cutter mounted, respectively, on said arms and having a longitudinal adjustment thereon, substantially as described.

4. In a wheel-rim-bolting machine, the combination of the adjustable vertical spindle 5, the revolving sleeve 4, the adjustable arms 7 and 8, carried by said sleeve, and a nut-wrench and a bolt-cutter mounted on said arms, substantially as described.

5. In a wheel-rim-bolting machine, the combination, with the spindle 5 and the sleeve 4, having an arm 8, of the bolt-cutter comprising the head 18, mounted on said arm, and the cutting-tool 16 and lever 15, connected with said head, substantially as described.

6. In a wheel-rim-bolting machine, the combination of the spindle 5, the stud 9, the sleeve 4, having longitudinally-adjustable arms 7 and 8, and tools carried by said arms, substantially as described.

7. In a wheel-rim-bolting machine, the combination, with a vertical rotary sleeve or support having horizontal arms, of tools mounted on said arms and having a longitudinal adjustment to and from the wheel-rim, substantially as described.

8. In a wheel-rim-bolting machine, the combination, with a revolving sleeve 4, having a horizontal longitudinally-adjustable arm 8, of the cutter-head 18, longitudinally adjustable on said arm and provided with a seat or anvil 21, and the cutting-tool 16, carried by said cutter-head, substantially as described.

9. In a wheel-rim-bolting machine, the combination of the vertical spindle 5 and the revolving sleeve 4, provided with horizontal tool-carrying arms, and means for imparting a relative vertical adjustment to the spindle and sleeve to bring the wheel and tools into juxtaposition, substantially as described.

In testimony whereof I have hereunto set my hand.

WILLIAM J. KAUFFMAN.

Witnesses:
  W. A. REITER,
  A. F. GWINNER.